United States Patent [19]

Hormadaly

[11] Patent Number: 4,476,039

[45] Date of Patent: Oct. 9, 1984

[54] STAIN-RESISTANT RUTHENIUM OXIDE-BASED RESISTORS

[75] Inventor: Jacob Hormadaly, Wilmington, Del.

[73] Assignee: E. I. Du Pont de Nemours and Company, Wilmington, Del.

[21] Appl. No.: 460,059

[22] Filed: Jan. 21, 1983

[51] Int. Cl.³ .............................................. A01B 1/06
[52] U.S. Cl. .................................... 252/518; 252/519; 338/20
[58] Field of Search ....................... 252/518, 519, 520; 338/20, 21; 106/1.23, 1.24, 1.22

[56] References Cited

U.S. PATENT DOCUMENTS

| | | | |
|---|---|---|---|
| 4,051,074 | 9/1977 | Asada | 252/512 |
| 4,101,708 | 7/1978 | Larry | 252/518 |
| 4,362,656 | 12/1982 | Hormadaly | 252/518 |

Primary Examiner—Josephine Barr

[57] ABSTRACT

Stain-free printable thick film resistor compositions comprising finely divided particles of (a) ruthenium oxide-based compound, (b) a thermally decomposable oxygen-containing compound of a nonalkali metal and (c) inorganic binder, all dispersed in (d) an organic medium.

10 Claims, No Drawings

STAIN-RESISTANT RUTHENIUM OXIDE-BASED RESISTORS

FIELD OF THE INVENTION

The invention is directed to stain-resistant ruthenium oxide-based resistor compositions.

BACKGROUND OF THE INVENTION

Thick film materials are mixtures of metal, glass and/or ceramic powders dispersed in an organic medium. These materials, which are applied to nonconductive substrates to form conductive, resistive or insulating films, are used in a wide variety of electronic and light electrical components.

The properties of individual thick film compositions depend on the specific constituents which comprise the compositions. Most thick film compositions contain three major components. The conductive phase determines the electrical properties and influences the mechanical properties of the final film. The binder, usually a glass and/or crystalline oxide, holds the thick film together and bonds it to the substrate; and the organic medium (vehicle) is the dispersing medium which influences the application characteristics of the composition and particularly its rheology.

High stability and low process sensitivity are critical requirements for thick film resistor compositions for microcircuit applications. In particular, it is necessary that resistivity ($R_{av}$) of the films be stable over a wide range of temperature conditions. Thus, the thermal coefficient of resistance (TCR) is a critical variable in any thick film resistor composition. Because thick film resistor compositions are comprised of a functional or conductive phase and a permanent binder phase, the properties of the conductive and binder phases and their interactions with each other and with the substrate affect both resistivity and TCR.

Functional phases based on ruthenium chemistry form the core of conventional thick film resistor compositions.

Ruthenium compounds based on the pyrochlore family have a cubic structure with each ruthenium atom surrounded by six oxygen atoms forming an octahedron. Each oxygen atom is shared by one other octahedron to form a three-dimensional network of $Ru_2O_6$ stoichiometry. The open areas within this framework are occupied by large cations and additional anions. A wide range of substitution in this secondary lattice is possible which makes for a great deal of chemical flexibility. The pyrochlore structure with the general formula $A_2B_2O_{6-7}$ is such a flexible structure. Pyrochlores which behave as metals, semiconductors or insulators can be obtained through controlled substitution on available crystallographic sites. Many current pyrochlore-based thick film resistors contain $Bi_2Ru_2O_7$ as the functional phase.

Ruthenium dioxide is also used as the conductive phase in thick film resistor compositions. Its rutile crystal structure is similar to that of pyrochlore in that each ruthenium atom is surrounded by six equidistant oxygen atoms forming an octohedron. However, in the rutile structure, each oxygen is shared by three octahedra. This results in a complex three-dimensional network in which, in contrast to the case of pyrochlore, chemical substitution is very limited.

A problem with ruthenium-containing resistors is that, while they are superior with respect to electrical properties when compared with other materials, they nevertheless tend to cause staining of the conductive metal terminations with which they are used. In particular, it is found that when such resistors contain significant amounts of ruthenium (e.g., 5% or higher, basis solids), the associated conductive termination layers of the resistor are frequently stained with a dark, black residue which renders the termination difficult to solder effectively.

BRIEF DESCRIPTION OF THE INVENTION

The invention is, therefore, directed to ruthenium oxide-based thick film resistor compositions which do not incur the above-described staining phenomenon. Thus, in its primary aspect, the invention is directed to a printable thick film resistor composition consisting essentially of an admixture of finely divided particles of:
(a) 5–75% wt. of a ruthenium oxide-based compound;
(b) 5–50% wt. of an oxygen-containing nonalkali metal compound which is thermally stable below 150° C. but which will decompose with the release of oxygen therefrom upon air firing of the composition at 150°–1200° C., the weight ratio of (a) to (b) being at least 0.1; and
(c) 5–20% wt. inorganic binder, dispersed in
(d) 5–45% wt. organic medium.

In a further aspect, the invention is directed to a patterned thin layer of the above-described printable thick film composition which has been dried and fired in an oxidizing atmosphere to effect thermal decomposition of the oxygen-containing nonalkali metal compound, volatilization of the organic medium and liquid phase sintering of the inorganic binder.

DETAILED DESCRIPTION OF THE INVENTION

A. Ruthenium Component

The invention is directed to resistor compositions in which the principal conductive phase is ruthenium oxide-based. At the present state of the art of ruthenium oxide-based resistors, this is known to include $RuO_2$ and ruthenium compounds corresponding to the formula

$$(M_cBi_{2-c})(M'_dRu_{2-d})O_{7-e}$$

wherein
M is at least one of the group consisting of yttrium, thallium, indium, cadmium, lead and the rare earth metals of atomic number 57–71, inclusive:
M' is at least one of platinum, titanium, chromium, rhodium and antimony;
c is a number in the range 0 to 2;
d is a number in the range 0 to about 0.5, that d is a number in the range 0 to 1 when M' is rhodium or more than one of platinum, and titanium; and
e is a number in the range 0 to 1, being at least equal to about c/2 when M is divalent lead or cadmium.

These compounds and their preparation are disclosed in U.S. Pat. No. 3,583,931 to Bouchard and also in German patent application OS 1,816,105.

The particle size of the above-described ruthenium-containing materials is not narrowly critical from the standpoint of their technical effectiveness in the invention. However, they should, of course, be of a size appropriate to the manner in which they are applied, which is usually screen printing, and to the firing conditions. Thus the metallic material particles should be no bigger than 10 μm and preferably should be below about 5 μm. As a practical matter, the available particle size of the metals is as low as 0.1 μm. It is preferred that the ruthenium component have an average surface area of at least 5 m$^2$/g and still more preferably at least 8 m$^2$/g.

Preferred ruthenium compounds include BiPbRu$_2$O$_{6.5}$, Bi$_{0.2}$Pb$_{1.8}$Ru$_2$O$_{6.1}$, Bi$_2$Ru$_2$O$_7$, Pb$_2$Ru$_2$O$_6$ and RuO$_2$. In addition, precursors of RuO$_2$, that is ruthenium compounds which upon firing will form RuO$_2$, are suitable for use in the invention, as are mixtures of any of these materials as well. Exemplary of suitable nonpyrochlore RuO$_2$ precursors are ruthenium metal, ruthenium resinates, BaRuO$_3$, Ba$_2$RuO$_4$, CaRuO$_3$, Co$_2$RuO$_4$, LaRuO$_3$, and Li$_2$RuO$_3$.

The composition may contain 5–75% wt. of the ruthenium-based component, it is preferred that it contain 10–60%.

B. Oxygen-Containing Compound

The oxygen-containing compounds which are effective in the composition of the invention are nonalkali metal oxygen-containing compounds which, when the compositions containing them are heated, will decompose substantially and give off oxygen. It is, however, important that the compounds not decompose too readily, lest they do so at the mildly elevated temperatures normally associated with the extensive mixing which is necessary for formulation. For this reason, the oxygen-containing compounds, when they are blended with the other components of the formulations, must be thermally stable up to at least about 150° C. However, the oxygen-containing compounds must, likewise, not be too refractory. That is, they must readily decompose at temperatures above 150° C. but must not require a temperature higher than the sintering temperature of the organic binder with which they are used. It is important to note here that the thermal decomposition temperature of the oxygen-containing compound by itself may be considerably different (usually lower) when it is blended with the other components of the formulation. Thus, the above-described thermal decomposition criteria are based upon the formulated material, i.e., decomposition in the presence of finely divided particles of ruthenium-containing compound, organic binder and inorganic medium.

Suitable types of oxygen-containing compounds are noble metal oxides; tri- and tetra-valent base metal oxides and chromates (including di- and poly-chromates) of base metals such as Ti, V, Cr, Mn, Fe, Co, Cu, Zn, Zr, Nb, Mo, Ta and W. The metal component of the oxygen-containing compound is not believed to be critical so long as (1) the metal is not an alkali metal; (2) the compound when formulated will decompose thermally no lower than 150° C. and no higher than the sintering temperature of the glass it is used with; and (3) the compound will decompose thermally with the release of oxygen therefrom. It is preferred that the formulated oxygen-containing compound decompose thermally in the range of 200°–800° C. and preferably 200°–400° C.

Suitable materials include Ag$_2$O, CoCrO$_4$, Pb$_3$O$_4$, PbO$_2$, Ba(NO$_3$)$_2$, Pb(NO$_3$)$_2$, and KMnO$_4$. Of these, Ag$_2$O and CoCrO$_4$ have been found to be most effective. However, CrO$_3$ is not useful in the invention for the reason that it decomposes at too low a temperature when it is formulated in the composition of the invention (Its decomposition temperature by itself is ca. 197° C.).

The amount of oxygen-containing compound in the formulated dispersions of the invention can vary from as low as 5% wt. to as high as 50% wt. and preferably 10–40% wt. Though the amount of oxygen-containing compound is not highly critical, it is nevertheless preferred to relate the amount of the oxygen-containing compound to the amount of ruthenium oxide-based compound. In particular, it has been found that the weight ratio of oxygen-containing compound should be at least about 0.1 and preferably 0.15 or even 0.2. Higher amounts may be used. However, when the amount of silver oxide is raised, the amount of conductive phase is correspondingly increased, resistance is thereby lowered and hot TCR is raised. On the other hand, when other oxygen-containing compounds are used, the conductive phase becomes diluted, resistance is thereby increased and hot TCR may become more negative.

As is the case for the ruthenate component of the invention, the particle size of the oxygen-containing material is not narrowly critical but should be of size appropriate to the manner in which the composition is applied.

C. Inorganic Binder

The glass frit used in the reference material of the present invention may be of any well known composition which has a melting temperature above the thermal decomposition temperature of the formulated oxygen-containing compound. The glass frits most preferably used are the borosilicate frits, such as lead borosilicate frit, bismuth, cadmium, barium, calcium or other alkaline earth borosilicate frits. The preparation of such glass frits is well-known and consists, for example, in melting together the constituents of the glass in the form of the oxides of the constituents, and pouring such molten composition into water to form the frit. The batch ingredients may, of course, be any compound that will yield the desired oxides under the usual conditions of frit production. For example, boric oxide will be obtained from boric acid, silicon dioxide will be produced from flint, barium oxide will be produced from barium carbonate, etc. The glass is preferably milled in a ball-mill with water to reduce the particle size of the frit and to obtain a frit of substantially uniform size.

The glasses are prepared by conventional glass-making techniques, by mixing the desired components in the desired proportions and heating the mixture to form a melt. As is well-known in the art, heating is conducted to a peak temperature and for a time such that the melt becomes entirely liquid and homogeneous. In the present work, the components are premixed by shaking in a polyethylene jar with plastic balls and then melted in a platinum crucible at the desired temperature. The melt is heated at the peak temperature for a period of 1–1½ hours. The melt is then poured into cold water. The maximum temperature of the water during quenching is kept as low as possible by increasing the volume of water to melt ratio. The crude frit after separation from water, is freed from residual water by drying in air or by displacing the water by rinsing with methanol. The crude frit is then ball-milled for 3–5 hours in alumina containers using alumina balls. Alumina picked up by the materials, if any, is not within the observable limit as measured by X-ray diffraction analysis.

After discharging the milled frit slurry from the mill, the excess solvent is removed by decantation and the frit powder is air-dried at room temperature. The dried powder is then screened through a 325 mesh screen to remove any large particles.

The major two functions of the frit are: (1) it aids the liquid phase sintering of the inorganic crystalline particulate materials; and (2) it forms noncrystalline (amorphous) or crystalline materials by devitrification during the heating-cooling cycle (firing cycle) in the preparation of thick film resistors. This devitrification process can yield either a single crystalline phase having the same composition as the precursor noncrystalline (glassy) material or multiple crystalline phases with different compositions from that of the precursor glassy material.

D. Organic Medium

The inorganic particles are mixed with an essentially inert liquid medium (vehicle) by mechanical mixing (e.g., on a roll mill) to form a paste-like composition having suitable consistency and rheology for screen printing. The latter is printed as a "thick film" on conventional dielectric substrates in the conventional manner.

Any inert liquid may be used as the vehicle. Various organic liquids, with or without thickening and/or stabilizing agents and/or other common additives, may be used as the vehicle. Exemplary of organic liquids which can be used are the aliphatic alcohols, esters of such alcohols, for example, acetates and propionates, terpenes such as pine oil, terpineol and the like, solutions of resins such as the polymethacrylates of lower alcohols, and solutions of ethyl cellulose in solvents such as pine oil, and the monobutyl ether of ethylene glycol monoacetate. A preferred vehicle is based on ethyl cellulose and beta terpineol. The vehicle may contain volatile liquids to promote fast setting after application to the substrate.

The ratio of vehicle to solids in the dispersions can vary considerably and depends upon the manner in which the dispersion is to be applied and the kind of vehicle used. Normally to achieve good coverage the dispersions will contain complementally, 60-90% solids and 40-10% vehicle. The compositions of the present invention may, of course, be modified by the addition of other materials which do not affect its beneficial characteristics. Such formulation is well within the skill of the art.

The pastes are conveniently prepared on a three-roll mill. The viscosity of the pastes is typically within the following ranges when measured on a Brookfield HBT viscometer at low, moderate and high shear rates:

| Shear Rate (Sec$^{-1}$) | Viscosity (Pa · S) | |
| --- | --- | --- |
| 0.2 | 100-5000 | — |
|  | 300-2000 | Preferred |
|  | 600-1500 | Most preferred |
| 4 | 40-400 | — |
|  | 100-250 | Preferred |
|  | 140-200 | Most preferred |
| 384 | 7-40 | — |
|  | 10-25 | Preferred |
|  | 12-18 | Most preferred |

The amount of vehicle utilized is determined by the final desired formulation viscosity.

Formulation and Application

In the preparation of the composition of the present invention, the particulate inorganic solids are mixed with the organic carrier and dispersed with suitable equipment, such as a three-roll mill, to form a suspension, resulting in a composition for which the viscosity will be in the range of about 100-150 pascal-seconds at a shear rate of 4 sec$^{-1}$.

In the examples which follow, the formulation was carried out in the following manner:

The ingredients of the paste, minus about 5% organic components equivalent to about 5% wt., are weighed together in a container. The components are then vigorously mixed to form a uniform blend; then the blend is passed through dispersing equipment, such as a three roll mill, to achieve a good dispersion of particles. A Hegman gauge is used to determine the state of dispersion of the particles in the paste. This instrument consists of a channel in a block of steel that is 25 $\mu$m deep (1 mil) on one end and ramps up to 0" depth at the other end. A blade is used to draw down paste along the length of the channel. Scratches will appear in the channel where the agglomerates' diameter is greater than the channel depth. A satisfactory dispersion will give a fourth scratch point of 10-1 $\mu$m typically. The point at which half of the channel is uncovered with a well dispersed paste is between 3 and 8 $\mu$m typically. Fourth scratch measurement of <20 $\mu$m and "half-channel" measurements of <10 $\mu$m indicate a poorly dispersed suspension.

The remaining 5% consisting of organic components of the paste is then added, and the resin content is adjusted to bring the viscosity when fully formulated to between 140 and 200 Pa.S at a shear rate of 4 sec$^{-1}$.

The composition is then applied to a substrate, such as alumina ceramic, usually by the process of screen printing, to a wet thickness of about 30-80 microns, preferably 35-70 microns, and most preferably 40-50 microns. The electrode compositions of this invention can be printed onto the substrates either by using an automatic printer or a hand printer in the conventional manner. Preferably automatic screen stencil techniques are employed using a 200 to 325 mesh screen. The printed pattern is then dried at below 200° C., e.g., about 150° C., for about 5-15 minutes before firing. Firing to effect sintering of both the inorganic binder and the finely divided particles of metal is preferably done in a well ventilated belt conveyor furnace with a temperature profile that will allow burnout of the organic matter at about 300°-600° C., a period of maximum temperature of about 800°-950° C. lasting about 5-15 minutes, followed by a controlled cooldown cycle to prevent over-sintering, unwanted chemical reactions at intermediate temperatures, or substrate fracture which can occur from too rapid cooldown. The overall firing procedure will preferably extend over a period of about 1 hour, with 20-25 minutes to reach the firing temperature, about 10 minutes at the firing temperature and about 20-25 minutes in cooldown. In some instances total cycle times as short as 30 minutes can be used.

Sample Preparation

Samples to be tested for Temperature Coefficient of Resistance (TCR) are prepared as follows:

A pattern of the resistor formulation to be tested is screen printed upon each of ten coded Alsimag 614 1×1" ceramic substrates and allowed to equilibrate at room temperature and then dried at 150° C. The mean thickness of each set of dried films before firing must be 22–28 microns as measured by a Brush Surfanalyzer. The dried and printed substrate is then fired for about 60 minutes using a cycle of heating at 35° C. per minute to 850° C., dwell at 850° C. for 9 to 10 minutes and cooled at a rate of 30° C. per minute to ambient temperature.

Resistance Measurement and Calculations

The test substrates are mounted on terminal posts within a controlled temperature chamber and electrically connected to a digital ohm-meter. The temperature in the chamber is adjusted to 25° C. and allowed to equilibrate, after which the resistance of each substrate is measured and recorded.

The temperature of the chamber is then raised to 125° C. and allowed to equilibrate, after which the resistance of the substrate is again measured and recorded.

The temperature of the chamber is then cooled to −55° C. and allowed to equilibrate and the cold resistance measured and recorded.

The hot and cold temperature coefficients of resistance (TCR) are calculated as follows:

$$\text{Hot TCR} = \frac{R_{125°C.} - R_{25°C.}}{R_{25°C.}} \times (10,000) \text{ ppm/°C.}$$

$$\text{Cold TCR} = \frac{R_{-55°C.} - R_{25°C.}}{R_{25°C.}} \times (-12,500) \text{ ppm/°C.}$$

The values of $R_{25°C.}$ and Hot and Cold TCR (HTCR and CTCR respectively) are averaged and $R_{25°C.}$ values are normalized to 25 microns dry printed thickness and resistivity is reported as ohms per square at 25 microns dry print thickness. Normalization of the multiple test values is calculated with the following relationship:

$$\text{Normalized Resistance} = \frac{\left(\begin{array}{c}\text{Avg. measured}\\\text{resistance}\end{array}\right) \times \left(\begin{array}{c}\text{Avg. dry print}\\\text{thickness, microns}\end{array}\right)}{25 \text{ microns}}$$

Coefficient of Variance

The coefficient of variance (CV) is a function of the average and individual resistances for the resistors tested and is represented by the relationship $\sigma/R_{av}$, wherein $$\sigma = \sqrt{\frac{\Sigma_i(R_i - R_{av})^2}{n-1}}$$

$R_i$ = measured resistance of individual sample.
$R_{av}$ = calculated average resistance of all samples ($\Sigma_i R_i/n$)
$n$ = number of samples
$CV = (\sigma/R) \times 100$ (%)

The invention will be better understood by reference to the following examples in which all compositions are given in percentages by weight unless otherwise noted.

EXAMPLES

In the examples which follow, four different glass compositions were used having the composition given in Table I which follows:

TABLE 1

| | ORGANIC BINDER COMPOSITIONS | | | |
|---|---|---|---|---|
| | GLASS NO. | | | |
| | I | II | III | IV |
| Component | Mole % | | | |
| PbO | 28.1 | 27.2 | 16.0 | — |
| SiO$_2$ | 53.7 | 50.7 | 35.5 | 5.0 |
| B$_2$O$_3$ | 13.0 | 12.6 | 26.3 | 50.0 |
| Al$_2$O$_3$ | 5.2 | 5.0 | 4.5 | — |
| MnO | — | — | — | 40.0 |
| ZrO$_2$ | — | — | 2.8 | 5.0 |
| TiO$_2$ | — | 4.5 | — | — |
| CuO | — | — | 2.2 | — |
| ZnO | — | — | 12.7 | — |
| Total | 100.0 | 100.0 | 100.0 | 100.0 |

Furthermore, the organic medium used in the examples were based upon ethyl cellulose dissolved in a mixture of beta-terpineol and dibutyl carbitol. Organic media of this type are described in Felten, U.S. Pat. No. 4,070,200.

EXAMPLES 1–7

A series of seven screen-printable ruthenium-containing resistor pastes was prepared, each of which contained Ag$_2$O in a weight ratio of above 1.5 relative to the ruthenium-containing compound. The compositions were prepared by dispersing the finely divided solids into 25% by weight of inert organic medium. The pastes were then screen-printed using a 200-mesh screen onto 96% by weight Al$_2$O$_3$ substrates, terminated and then cofired to effect volatilization of the organic medium, thermal decomposition of the Ag$_2$O and liquid phase sintering of the glass. Each paste was used to prepare ten resistors in this manner. Unlike similar compositions which contained no thermally decomposable metal oxides, none of the fired resistors exhibited any discernible amount of staining. The composition of the resistor pastes and the electrical properties of the resistors prepared therefrom are given in Table 2 below:

TABLE 2

| | ELECTRICAL PROPERTIES OF RuO$_2$ RESISTORS CONTAINING Ag$_2$O | | | | | | |
|---|---|---|---|---|---|---|---|
| | EXAMPLE NO. | | | | | | |
| | 1 | 2 | 3 | 4 | 5 | 6 | 7 |
| | % By Weight | | | | | | |
| Paste Composition | | | | | | | |
| RuO$_2$ | 20.0 | 19.8 | 20.0 | 20.0 | 20.0 | 20.0 | 20.0 |
| Ag$_2$O | 35.0 | 34.6 | 35.0 | 34.0 | 32.5 | 32.5 | 32.5 |
| Glass I | — | — | 17.5 | 17.5 | 17.5 | — | 8.75 |
| Glass II | — | — | — | — | — | 17.5 | 8.75 |
| Glass III | 20.0 | 19.8 | — | — | — | — | — |
| MnV$_2$O$_6$ | — | 1.0$^{(1)}$ | — | — | — | — | — |
| Resistor Properties | | | | | | | |
| $R_{av}$ (Ω/□) | 3.23 | 3.72 | 5.20 | 4.24 | 5.03 | 24.02 | 10.16 |
| CV (%) | 2.12 | 9.47 | 5.88 | 9.93 | 3.56 | 3.80 | 3.92 |
| HTCR (ppm/°C.) | +1131.5 | +858.7 | +316.6 | +402.5 | +497.4 | −490.7 | −48.3+ |

TABLE 2-continued

ELECTRICAL PROPERTIES OF RuO$_2$
RESISTORS CONTAINING Ag$_2$O

| | EXAMPLE NO. | | | | | |
|---|---|---|---|---|---|---|
| | 1 | 2 | 3 | 4 | 5 | 6 | 7 |
| | | | | % By Weight | | | |
| σ (HTCR) | ±33.2 | ±37.5 | ±11.6 | ±54.9 | ±22.0 | ±21.4 | ±17.2 |

(1)Roll milled into 1

The above data show that the resistors of Examples 1 and 2 had good low resistivities and coefficients of variance (CV). However, both the HTCR values and the fluctuation in HTCR [Σ (HTCR)] were too high for many applications. On the other hand, the resistors of Examples 3 and 4, in which a different glass was used, showed that quite low resistivity and CV as well as moderately positive HTCR values can be achieved.

Examples 5 and 6 illustrate how the choice of the inorganic binder can be used with otherwise identical compositions to adjust HTCR over a wide range. Example 7, which is a blend of the composition of Examples 5 and 6, show that blending of materials having substantially high positive and negative HTCR values can be used to obtain resistors having quite low intermediate HTCR values.

EXAMPLES 8-12

A series of four screen-printable ruthenium-containing resistor pastes was prepared in which the weight ratio of Ag$_2$O to RuO$_2$ was 0.75-1.1. The compositions were prepared by dispersing the finely divided solids into 25% by weight of inert organic medium. The pastes were then screen-printed onto 96% wt. Al$_2$O$_3$ substrates, terminated and then cofired to effect volatilization of the organic medium, thermal decomposition of the Ag$_2$O and liquid phase sintering of glass. Again, each paste was used to prepare ten resistors. All of the compositions gave stain-free terminations.

The compositions of the resistor pastes and the electrical properties of the resistors prepared therefrom are given in Table 3 below:

TABLE 3

ELECTRICAL PROPERTIES OF RuO$_2$
RESISTORS CONTAINING Ag$_2$O

| | EXAMPLE NO. | | | | |
|---|---|---|---|---|---|
| | 8 | 9 | 10 | 11 | 12 |
| | | | % By Weight | | |
| Paste Composition | | | | | |
| RuO$_2$ | 25.0 | 25.0 | 25.0 | 25.0 | 22.5 |
| Ag$_2$O | 27.5 | 27.5 | 27.5 | 27.5 | 22.5 |
| Glass I | 8.75 | 5.0 | 6.9 | 6.9 | 8.75 |
| Glass II | 8.75 | 12.5 | 10.6 | 10.6 | 8.75 |
| MnV$_2$O$_6$ | 5.0 | 5.0 | 5.0 | 5.0 | 5.0 |
| Screen Mesh | 200 | 200 | 200 | 325 | 200 |
| Electrical Properties | | | | | |
| R$_{av}$ (Ω/□) | 8.32 | 6.30 | 8.09 | 12.39 | 8.80 |
| CV (%) | 2.37 | 1.48 | 1.51 | 2.45 | 4.32 |
| HTCR (ppm/°C.) | +2.8 | +198.5 | +81.4 | +67.9 | +26.0 |
| σ (HTCR) | ±19.0 | ±19.9 | ±12.4 | ±15.6 | ±13.7 |

All of the resistors for Examples 8-12 exhibited quite good electrical properties. Example 11 is of interest in that it shows that the use of the finer mesh screen alone reduced the resistivity as compared with Example 10. This effect is, of course, a reflection of the greater thinness and thus higher resistivity of the resistor printed through the finer screen. The thinness of the layer did not, however, have any noticeable effect on HTCR.

EXAMPLES 13-21

A series of nine screen-printable ruthenium-containing resistor pastes was prepared in which the weight ratio of Ag$_2$O to RuO$_2$ was 0.25-1.5. In addition, CoCrO$_4$ was used as the inorganic oxygen-containing compound in Example 21 at a weight ratio of only 0.08. The compositions were prepared in the manner of the previous examples by dispersing the finely divided solids into 25% by weight inert organic medium. The pastes were then screen-printed onto 96% by weight Al$_2$O$_3$ substrates, terminated and then cofired to effect volatilization of the organic medium, thermal decomposition of the Ag$_2$O or CoCrO$_4$ and liquid phase sintering of the glass. Each paste was used to prepare ten resistors. All of the resistor terminations were stain-free.

The compositions of the resisitor pastes and the electrical properties of the resistors prepared therefrom are given in Table 4 below:

TABLE 4

ELECTRICAL PROPERTIES OF RuO$_2$
RESISTORS CONTAINING Ag$_2$O

| | EXAMPLE NO. | | | | | | | | |
|---|---|---|---|---|---|---|---|---|---|
| | 13 | 14 | 15 | 16 | 17 | 18 | 19 | 20 | 21 |
| | | | | | % By Weight | | | | |
| Paste Composition | | | | | | | | | |
| RuO$_2$ | 35.0 | 40.0 | 32.5 | 32.5 | 32.5 | 27.5 | 22.5 | 20.0 | 40.0 |
| Ag$_2$O | 15.0 | 10.0 | 22.5 | 22.5 | 22.5 | 27.5 | 32.5 | 35.0 | — |
| CoCrO$_4$ | — | — | — | — | — | — | — | — | 3.0 |
| Glass IV | 22.5 | 22.5 | 17.5 | 18.0 | 18.5 | 17.5 | 17.5 | 17.5 | 30.0 |
| MnV$_2$O$_6$ | 2.5 | 2.5 | 2.5 | 2.0 | 1.5 | 2.5 | 2.5 | 2.5 | 2.0 |
| Electrical Properties | | | | | | | | | |
| R$_{av}$ (Ω/□) | 8.83 | 8.15 | 7.16 | 5.97 | 6.32 | 8.33 | 10.87 | 11.50 | 17.85 |
| CV (%) | 2.27 | 3.06 | 1.45 | 3.47 | 2.49 | 2.15 | 1.60 | 1.89 | 2.09 |
| HTCR (ppm/°C.) | −283.3 | −373.3 | −33.2 | −19.9 | +0.4 | +24.8 | +47.7 | +40.1 | −628.0 |
| σ (HTCR) | ±35.0 | ±33.1 | ±13.4 | ±15.9 | ±23.1 | ±23.4 | ±23.4 | ±8.0 | ±10.3 |

TABLE 4-continued

| | ELECTRICAL PROPERTIES OF RuO₂ RESISTORS CONTAINING Ag₂O | | | | | | | | |
|---|---|---|---|---|---|---|---|---|---|
| | EXAMPLE NO. | | | | | | | | |
| | 13 | 14 | 15 | 16 | 17 | 18 | 19 | 20 | 21 |
| | | | | | % By Weight | | | | |
| CTCR (ppm/°C.) | — | — | −173.0 | — | — | — | — | — | — |
| σ (TCR) | — | — | ±19.3 | — | — | — | — | — | — |

All of the resistors of Examples 13–21 exhibited good low resistivity and CV. Furthermore, by lowering the amount of RuO₂ to 32.5%, quite outstanding HTCR values were obtained for all of Examples 15–20.

I claim:

1. A printable thick film resistor composition consisting essentially of an admixture of finely divided particles of:
   (a) 5–75% wt. a ruthenium oxide-based compound;
   (b) 5–50% wt. an oxygen-containing nonalkali metal compound which is thermally stable below 150° C. but which will decompose with the release of oxygen therefrom upon air firing of the composition at 150°–1200° C., the mole ratio of (a) to (b) being at least 0.1; and
   (c) 5–20% wt. inorganic binder, dispersed in
   (d) 5–45% wt. organic medium.

2. The composition of claim 1 in which (a) is 10–60% by weight of the composition.

3. The composition of claim 1 in which (b) is 10–40% by weight of the composition.

4. The composition of claim 1 in which (b) is 15–30% by weight of the composition.

5. The composition of claim 1 in which (a) is selected from the group consisting of RuO₂, ruthenium-containing pyrochlores, precursors of RuO₂, and mixtures thereof.

6. The composition of claim 1 in which (b) is selected from the group consisting of oxides, chromates, nitrates and permanganates of nonalkali metals and mixtures thereof.

7. The composition of claim 6 in which (b) is Ag₂O.

8. The composition of claim 6 in which (b) is CoCrO₄.

9. The composition of claim 1 in which (c) is selected from the group consisting of lead-containing glasses, lead-free manganese-containing glasses and mixtures thereof.

10. A resistor comprising a patterned thin layer of the dispersion of the compositions of any of claims 1–9 or mixtures thereof which has been dried and fired in an oxidizing atmosphere to effect thermal decomposition of the oxygen-containing nonalkali metal compound, volatilization of the organic medium and liquid phase sintering of the inorganic binder.

* * * * *